United States Patent
Courtois et al.

(12) 
(10) Patent No.: US 6,244,517 B1
(45) Date of Patent: Jun. 12, 2001

(54) SYSTEM FOR FIXING AN ELECTRIC TERMINAL CONNECTOR

(75) Inventors: Alain Courtois; Jean-Pierre Huet, both of Blois (FR)

(73) Assignee: Dubuis, Societe Anonyme, Blois Cedex (FR)

( * ) Notice: Subject to any disclaimer, the term of this patent is extended or adjusted under 35 U.S.C. 154(b) by 0 days.

(21) Appl. No.: 09/068,865

(22) PCT Filed: Sep. 26, 1997

(86) PCT No.: PCT/FR97/01694

§ 371 Date: May 19, 1998

§ 102(e) Date: May 19, 1998

(87) PCT Pub. No.: WO98/13901

PCT Pub. Date: Apr. 2, 1998

(30) Foreign Application Priority Data

Sep. 26, 1996 (FR) .................................................. 96 11723

(51) Int. Cl.[7] .................................................... F16B 13/00

(52) U.S. Cl. .................. 238/14.05; 238/14.2; 238/14.14; 191/29 R; 439/883; 439/801; 439/927

(58) Field of Search ............................... 238/14.05, 14.2, 238/14.14; 191/29 R; 439/883, 801, 927

(56) References Cited

U.S. PATENT DOCUMENTS

| 3,672,053 | * | 6/1972 | Wiss ....................................... 30/267 |
| 4,174,148 | | 11/1979 | Obuch et al. ......................... 339/246 |
| 5,082,387 | * | 1/1992 | DeVries ................................. 403/146 |
| 5,533,852 | | 7/1996 | Matthews .............................. 411/534 |
| 5,707,190 | * | 1/1998 | Hiraguri et al. ........................ 411/56 |

FOREIGN PATENT DOCUMENTS

| 2580744 | | 10/1986 | (FR) . |
| 2580744 A1 | * | 10/1986 | (FR) ............................... F16B/39/24 |
| 2692632 A1 | * | 12/1993 | (FR) ............................... F16B/13/00 |
| 2692632 | | 12/1993 | (FR) . |
| WO93/09355 | | 5/1993 | (WO) . |

* cited by examiner

Primary Examiner—S. Joseph Morano
Assistant Examiner—Frantz F. Jules
(74) Attorney, Agent, or Firm—Greenblum & Bernstein, P.L.C.

(57) ABSTRACT

System for attaching an electric terminal connector to an element, including a threaded rod being one of, integral with, or fixed to the element and a nut, provided with a clamping washer adapted to clamp a terminal connector on one of, the element, or an electrically conductive member attached to the element. The clamping washer has a surface thereon adapted to be positioned across a surface on a terminal connector. The surfaces across from a terminal connector and the clamping washer are rotatable relative to each other without unscrewing the nut.

18 Claims, 4 Drawing Sheets

SYSTEM FOR FIXING AN ELECTRIC TERMINAL CONNECTOR

BACKGROUND OF THE INVENTION

1. Field of the Invention

The invention concerns a system for fixing an electric connector terminal, especially to the core of a rail in a railway.

2. Background of the Invention

It is known to fix a cable on a rail of a railway, so as to ensure for example, a ground contact and/or reverse current contact, etc. It is known, for example, to make an aluminothermic weld at the end of the cable or to use a terminal fixed to the end.

To this end, in the last case, the terminal is fixed on the rail by screwing, for example, by utilizing of a threaded rod integral with or fixed thereto and a nut, provided with a clamping washer, and adapted to clamp the terminal on the rail or an electrically conductive piece fixed thereto.

The threaded rod can be fixed or attached by any means and can be especially constituted by the extension of an insert fixed into the rail, as described in French Patent No. 2 692 632, the same Applicant.

In this case, the insert has a flanged ring fixed in a hole provided in the rail, and on which the electric connector terminal is applied.

Such a system gives entire satisfaction in current use.

However, an ill-timed handling of the cable connected to the terminal, which cable is often quite rigid, risks causing a deterioration or a loosening of the terminal.

Indeed, a rotation of the cable, and therefore of the terminal, in the untightening direction causes a movement similar to the washer and the screw and thus an untightening thereof, which naturally deteriorates the passage of the current by increasing the electrical resistance resulting therefrom.

This ill-timed handling can be caused on a worksite during work or during a check.

Besides human handling, the cables can be hooked by tools or mechanized railway machinery, such as tamping machines, for example.

That is why one sought to further reinforce the self-locking ability of this type of fixing, even during handling of the cable.

One especially thought to affix the terminal and the ring in rotation by means of teeth, for example, but such a system has the risk of significant damage in case of substantial biases on the cable.

In this regard, document U.S. Pat. No. 4,174,148,-A, although adapted to the fixing of small conductors, seeks to increase the efficiency of tightening by decreasing the friction of the tightening mechanism so as to immobilize at best the conductor on its support. Assuming that such a system be adaptable to the elements to be fixed according to the invention, it would have the same drawback as the one previously mentioned.

SUMMARY OF THE INVENTION

That is why the inventors sought a fixing allowing, on the contrary, the terminal to rotate in case of a substantial handling of the cable, while conserving its normal electric conduction. Obviously, however, the invention is not exclusively related to a connector on a rail of a railway, but of course to any element adapted to receive such a terminal.

To attain these seemingly contradictory objects, the invention proposes therefore a system for fixing an electric terminal connector on an element such as a rail of a railway, conventionally including a threaded rod integral with or fixed to the element and a nut, provided with a clamping washer, and adapted to clamp the terminal on said element or an electrically conductive piece fixed thereto, such as a flanged ring.

However, the system according to the invention is especially remarkable in that the surfaces across from the terminal and the clamping washer are made rotatable relative to each other by at least an antifriction treatment, without unscrewing the nut. Thus, the invention solves the problem quite surprisingly.

The nut is generally a set screw whereas the clamping washer can advantageously be either crimped on the nut so as to stay firmly fixed to the nut while remaining free in rotation, or yet be constituted by a base integral with the nut.

In this case, the antifriction treatment is obtained on the surface of the clamping washer turned towards the terminal.

However, it is not always possible or simple to obtain a coating on the clamping washer.

That is why the invention proposes an embodiment which is remarkable in that it includes an antifriction washer inserted between the terminal and the clamping washer, this washer having at least one of its surfaces antifriction treated so as to be capable of rotating by sliding on the clamping washer (6) and/or to allow the terminal (6) to rotate by sliding on the treated surface.

According to a particular embodiment, which avoids loss and improper mounting, the antifriction washer is integral with the clamping washer, its antifriction treated surface being the one opposite to the clamping washer.

Thus, it is understood that if it is the surface of the antifriction washer turned towards the terminal that is treated, the terminal can slide on the antifriction washer while the latter will be maintained integral in rotation with the clamping washer of the nut, by friction, and/or by fixing according to the last mentioned embodiment.

In the inverse case where it is the other surface that is treated, or yet if the antifriction washer is turned over, the latter will remain integral in rotation with the terminal but will slide on the clamping washer.

In all of the cases, the antifriction washer must not be inserted on the side opposite the clamping washer, which would make the system inefficient.

The antifriction treatment is, for example, obtained with a PTFE-base treatment, or even, if necessary, with a PTFE- and lead powder-base mixture, i.e., a mixture electrically made conductive. In the case especially of the additional antifriction washer, the alloy itself of the latter could be antifriction by nature.

BRIEF DESCRIPTION OF THE DRAWINGS

The invention will be well understood by reading the description that follows and refers to the annexed drawings in which.

DETAILED DESCRIPTION OF THE INVENTION

Figure 1:
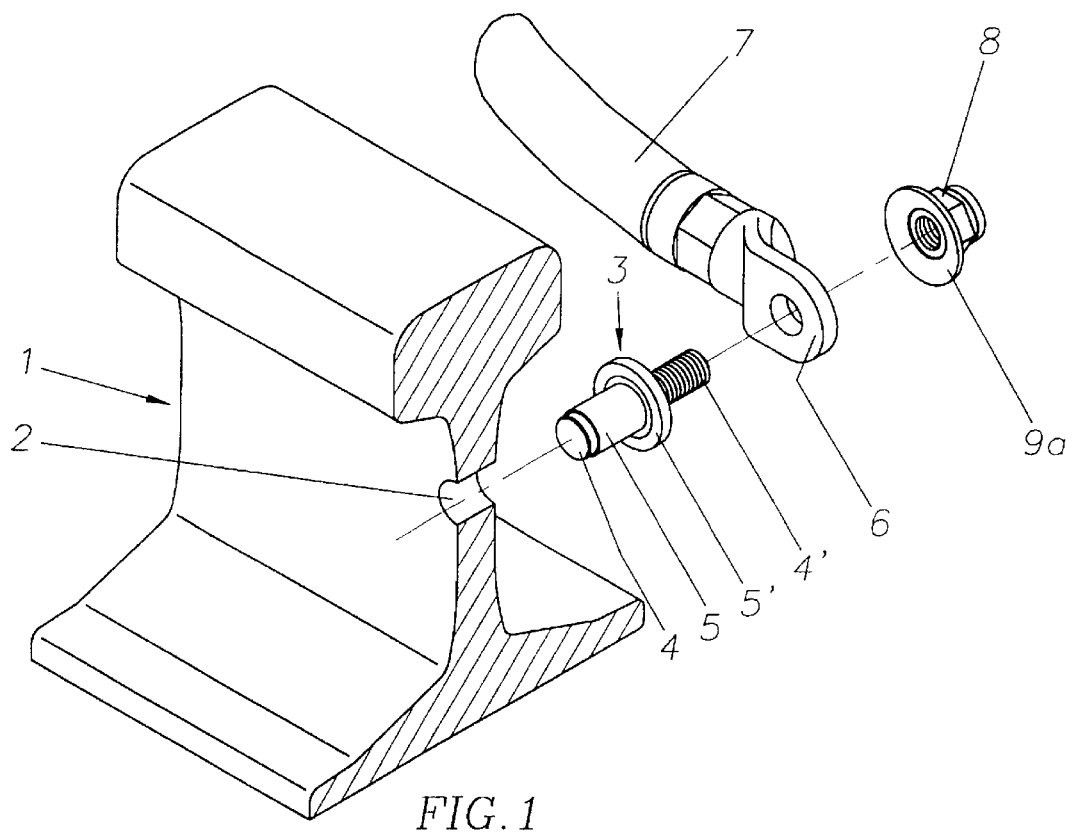
FIGS. 1–4 show in perspective four embodiments according to the invention, before assembly of the pieces together.

On the drawings, one can see in part a rail 1 of a railway in the core of which is here provided a cylindrical hole 2 adapted to receive an insert 3. As already said however, the rail 1 can, of course, be another element (e.g., terminal/clip . . . ).

In this example, the insert 3 utilizes a pin 4 provided with all extension in the form of a threaded rod 4' and by a ring 5 provided with a flange 5'.

Figure 5:
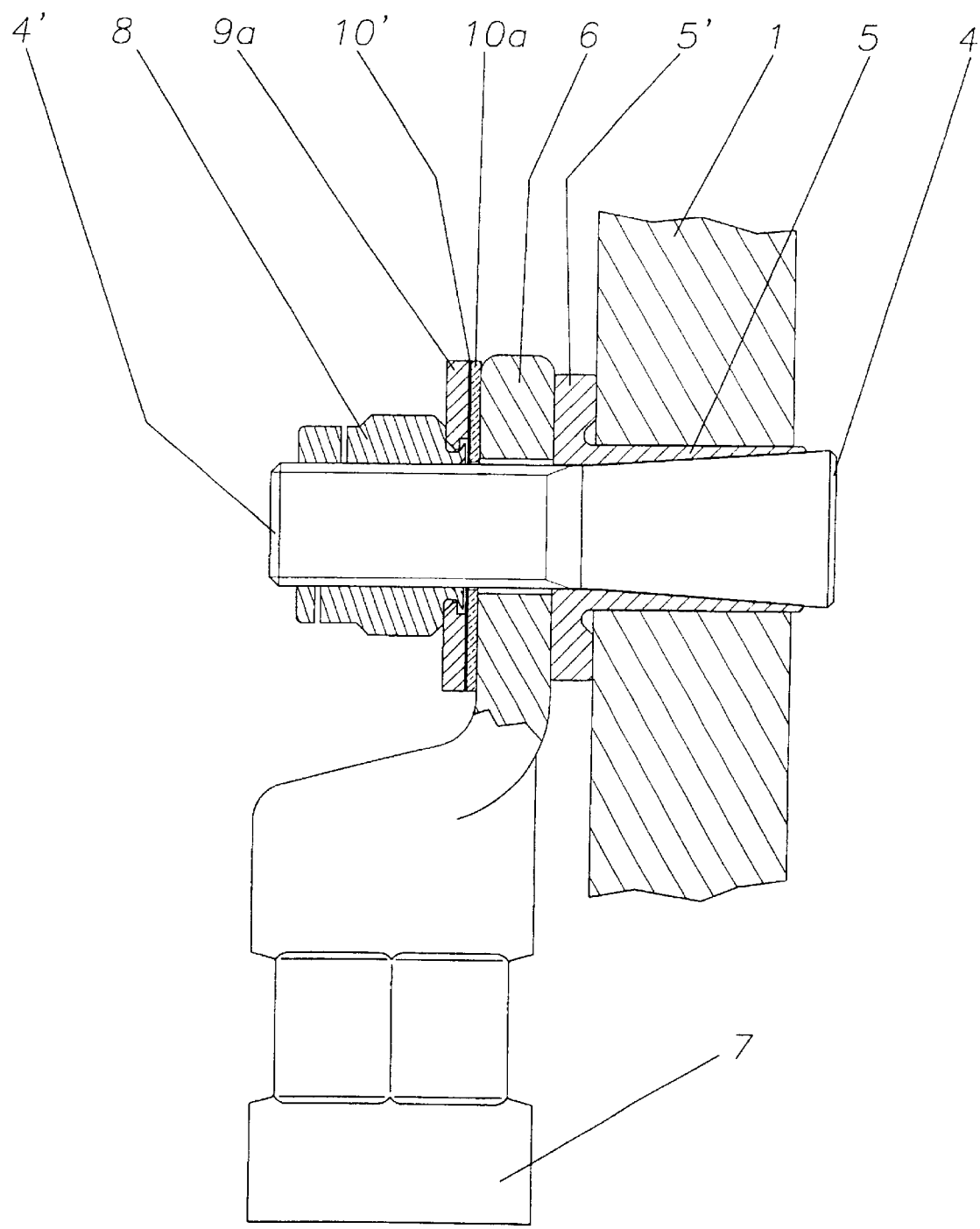
FIG. 5 is a transverse cross section of the embodiment of FIG. 3, after assembly of the pieces together.
Figure 6:
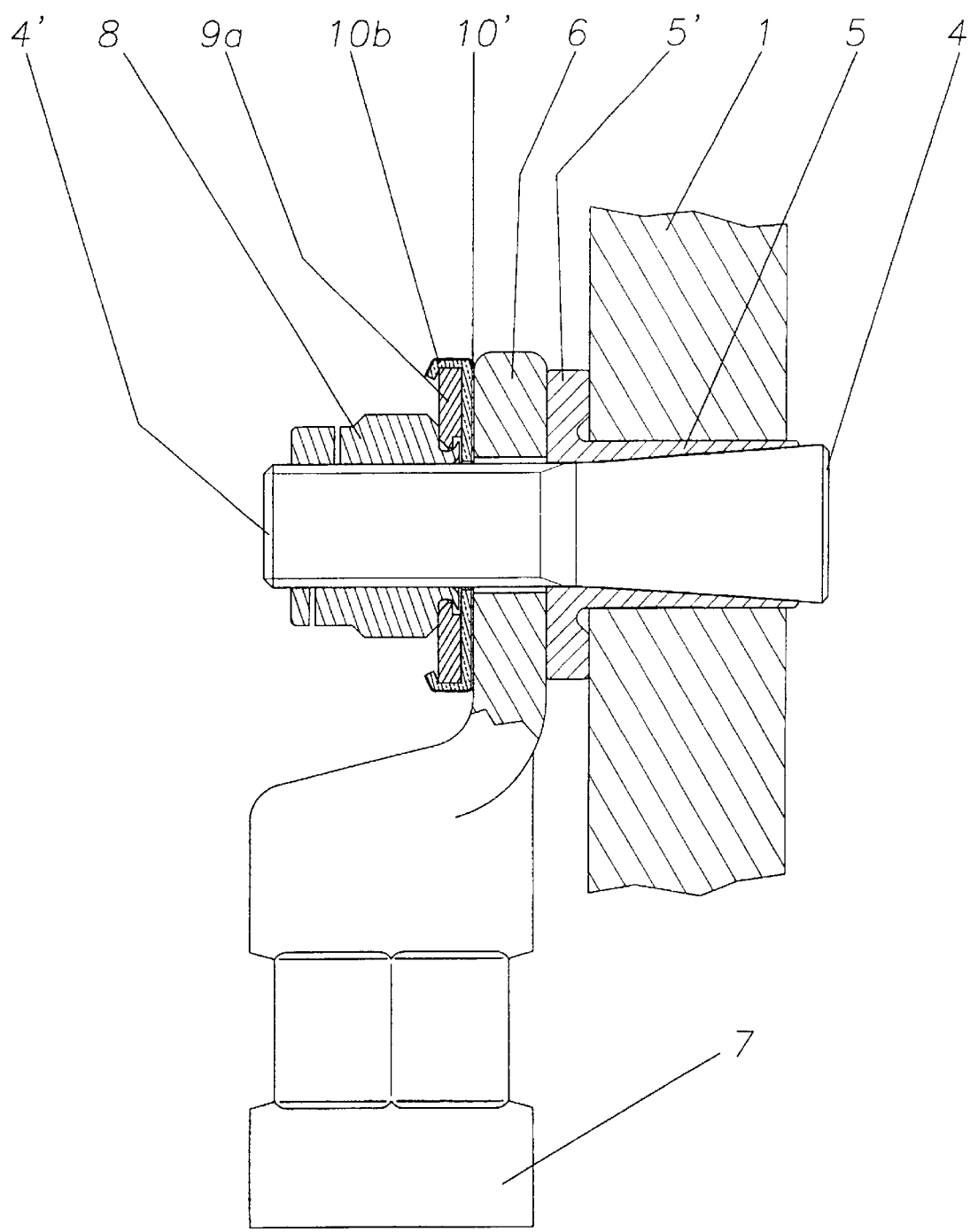
FIG. 6 is a cross section similar to FIG. 5 showing an alternative embodiment.

The fixing 3 of an insert of this type in the cylindrical hole 2 is described in the aforementioned Patent FR-2 692 632, the ring 5 being expanded by force and the flange 5' applying itself on the core of the rail as shown clearly in FIGS. 5 and 6, so that a perfect contact is established between the ring L5 and the rail L1.

However, it is obvious that this insert can be positioned differently, the threaded rod 4' can even be an integral part of the rail 1 or be welded thereto.

The threaded rod 4' is adapted to receive an electric connector terminal 6, for example, made of tinned copper, the terminal 6 which is here fixed to a cable 7 being adapted to apply itself on the flange 5', thereby ensuring an excellent electrical contact.

To fix the terminal 6 on the flange 5', one uses a nut 8 which is screwed onto the threaded rod 4'.

The nut 8 is preferably a set nut adapted to prevent or at least limit unscrewing of the nut.

To this end, the nut 8 has, for example, an internal threading partly slit to ensure an elastic pinching.

Moreover, one inserts, between the nut 8 and the terminal 6, a clamping washer 9a, 9b.

In the embodiments of FIGS. 1, 3, 5 and 6, the clamping washer 9a, made of stainless steel, for example, is an elastic washer which, here, is furthermore firmly crimped, i.e., fixed to the nut but free in rotation, so as to especially avoid its being forgotten or lost. The washer 9a could, of course, be completely independent of the nut.

Figure 2:
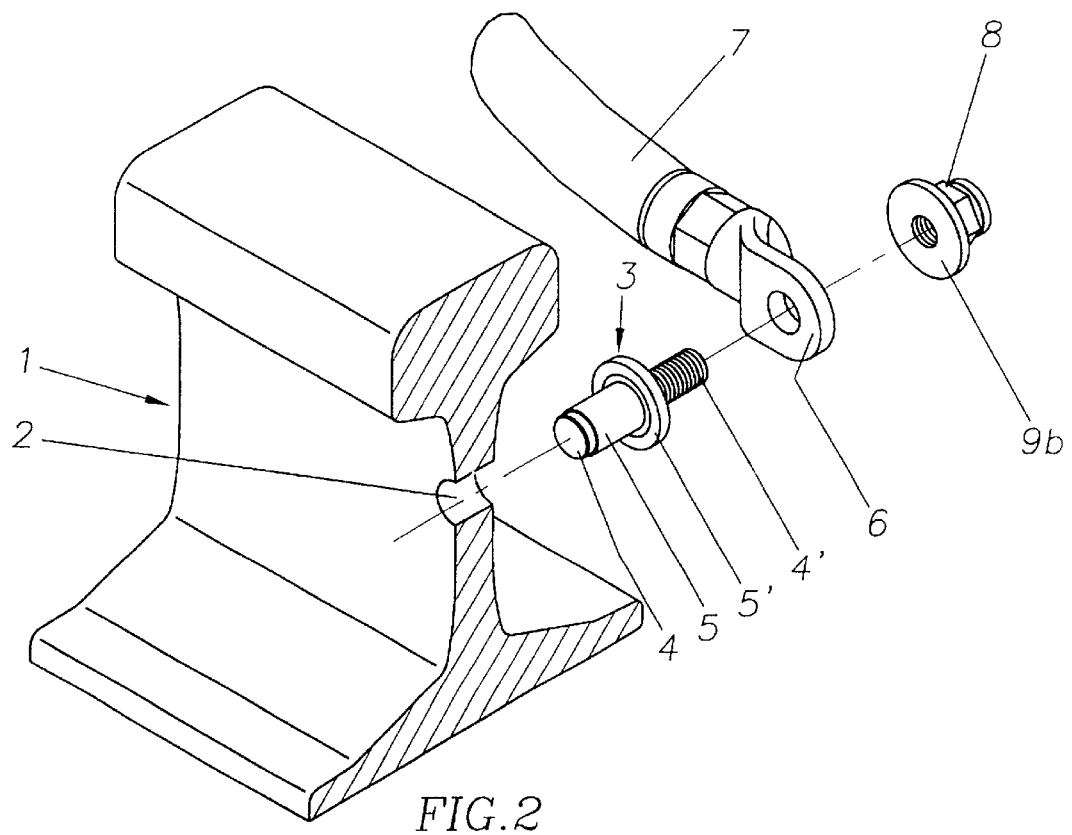
Figure 3:
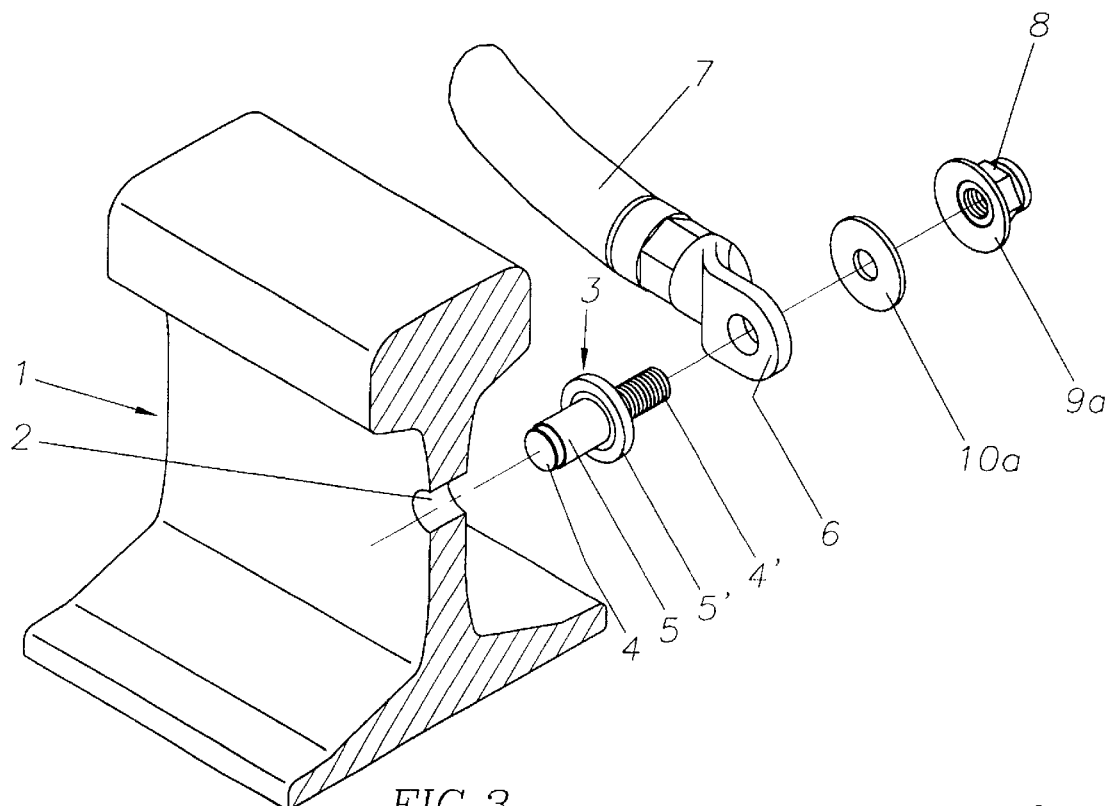
Figure 4:
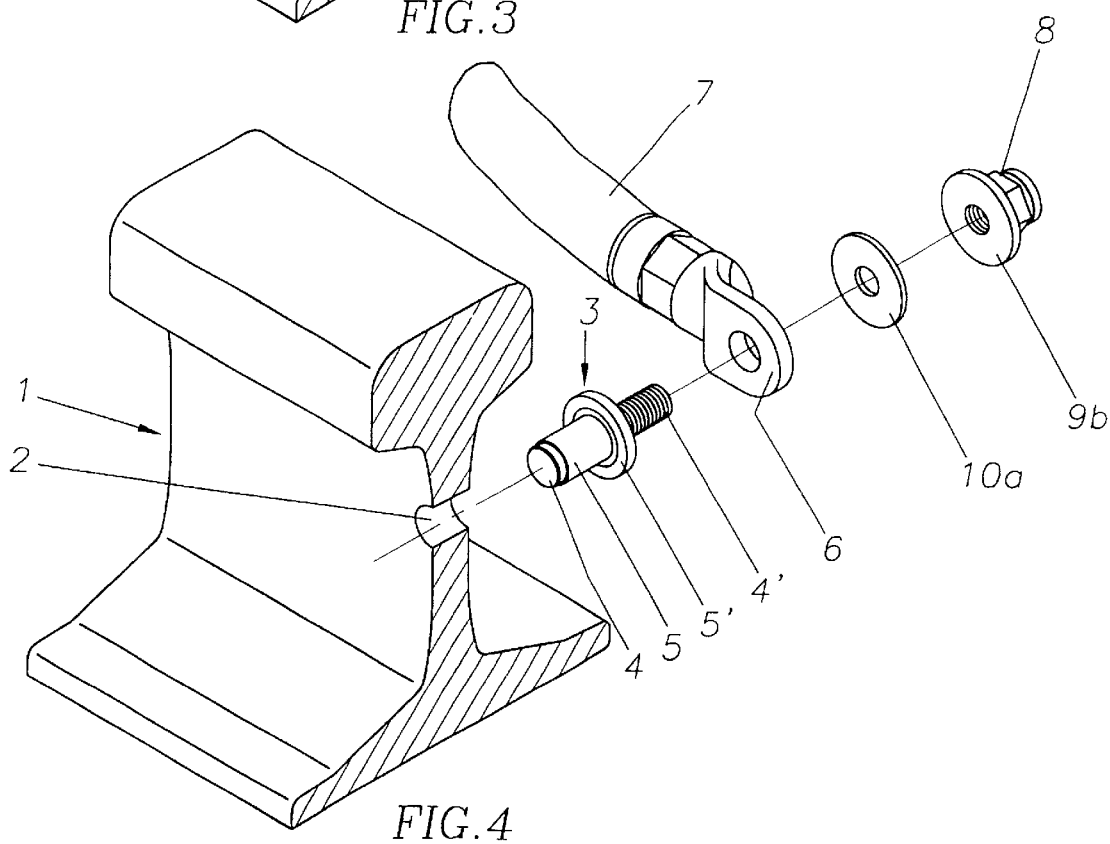

In the embodiment of FIGS. 2 and 4, the washer 9b is here constituted by a base integral with the nut 8, but one understands that the result is the same.

In the embodiments of FIGS. 3–6 comprising the clamping washers 9a and 9b respectively (as, in fact, for FIGS. 1 and 2), one has provided, furthermore, contrary to the FIGS. 1 and 2, an additional washer 10a, 10b, which is inserted between the terminal 6 and clamping washer 9a, 9b.

In the embodiments of FIGS. 1 and 2, the surface of the washer 9a, 9b, turned towards the terminal 6 is antifriction treated whereas in the embodiments of FIGS. 3–6, it is at least one of the surfaces of the additional washer 10a, 10b, called an antifriction washer, that is treated and, for example, the surface turned towards clamping washer 9a, 9b (FIG. 5), or on the contrary, the surface turned towards the terminal (FIG. 6), which is schematically shown as 10' in the FIGS. 5 and 6.

In the embodiment of FIG. 6, in addition to the fact that the treated surface 10' is turned towards the terminal, one can advantageously, in this case, as shown in said Figure, affix the washer 10b to the clamping washer 9a, 9b, for example, by crimping on the clamping washer or in the center thereof (in the same manner as, for example, the clamping ring on the nut 8), or still by glueing, folded back tabs, etc.

In this way, not only the washer 10b cannot be omitted during assembly, but more so this prevents any improper assembly such as a positioning the washer 10b between the terminal 6 and the flange 5' of the ring 5, which would not only stop the effectiveness of the system, but would furthermore increase the electrical resistance. One understands that such an embodiment comes back somewhat to the first embodiments described in which it is the clamping washer 9a, 9b which is antifriction treated.

The antifriction treatment is, for example, obtained by a PTFE coating, possibly mixed with lead microspheres. The washer 10a, 10b, for example made of bronze, thus coated, could also be wholly constituted, as already described, of an antifriction alloy.

One now understands that after an adequate tightening of the nut 8, any ill-timed movement of the terminal 6 will allow the latter to rotate by sliding either on the clamping washer 9a, 9b (FIGS. 1, 2), or on the washer 10b (FIG. 6), or yet indirectly on the clamping washer by way of and by driving the washer 10a (FIGS. 3–5) along.

Furthermore, in all of the cases, the friction of the terminal 6 on the ring can only improve the evenness of the surfaces in contact.

A treatment on the two surfaces of the washer 10a can also be envisioned.

If one knows how to do fixings by screwing which are unscrewable in most cases and if, moreover, one also knows how to make rotating contacts, the invention obtains two functions which seemed up till now incompatible since it allows conserving an excellent electrical contact by tightening while allowing a rotation in the extreme cases, without the risk of a negative effect on the electrical contact.

Furthermore, the invention is not limited to having envisioned the use of an antifriction treatment for a fixing system, but this treatment should be also obtained only on certain areas.

What is claimed is:

1. System for attaching an electric terminal connector to an element, comprising:
    a threaded rod adapted to be secured to the element;
    a nut adapted to threadably engage the threaded rod;
    a clamping washer adapted to be disposed between the nut and the electrical terminal connector;
    an antifriction washer adapted to be disposed between the clamping washer and the electrical terminal connector;
    a conductive coating disposed on at least one surface of the antifriction washer,
    the nut being adapted to force the clamping washer, antifriction washer, and the electrical terminal connector against the element,
    wherein the conductive coating allows the electrical terminal connector to rotate with respect to the element even when the nut forces the electrical terminal connector against the element.

2. System for attaching an electric terminal connector to an element, comprising:
    a threaded rod adapted to be secured to the element;
    a nut adapted to threadably engage the threaded rod;
    at least one washer adapted to be disposed between the nut and the electrical terminal connector;
    the nut being adapted to force the at least one washer and the electrical terminal connector against the element; and
    a conductive coating disposed against a surface of the electrical terminal connector,
    wherein the conductive coating allows the electrical terminal connector to rotate with respect to the element when the nut forces the at least one washer and the electrical terminal connector against the element.

3. The system of claim 2, wherein the element is a rail of a railway.

4. The system of claim 3, further comprising an electrically conductive member disposed between the electrical terminal connector and the element.

5. The system of claim 4, wherein the electrically conductive member comprises a ring having a flange thereon.

6. The system of claim 2, further comprising an electrically conductive member disposed between the electrical terminal connector and the element.

7. The system of claim 6, wherein the electrically conductive member comprises a ring having a flange thereon.

8. The system of claim 2, wherein the conductive coating comprises an antifriction treatment.

9. The system of claim 2, wherein the nut comprises a set nut.

10. The system of claim 2, wherein the at least one washer comprises a clamping washer which is crimped on the nut so as to stay firmly attached to said nut while remaining free to rotate.

11. The system of claim 2, wherein the at least one washer comprises a clamping washer which includes a base integral with the nut.

12. The system of claim 2, wherein the at least one washer comprises a clamping washer which is rotatably mounted to the nut and wherein the conductive coating is provided on a terminal engaging surface of the clamping washer.

13. The system of claim 2, further comprising an antifriction washer disposed between the electrical terminal connector and the at least one washer.

14. The system of claim 13, wherein the conductive coating is disposed on an electrical terminal engaging surface of the antifriction washer.

15. The system of claim 2, wherein the conductive coating comprises a PTFE-base coating.

16. The system of claim 15, wherein the conductive coating comprises a PTFE-and lead powder-base mixture.

17. System for attaching an electric terminal connector to an element, comprising:

a threaded rod comprising a flange which is adapted to engage the electrical terminal connector, the threaded rod being adapted to be secured to the element;

a nut adapted to threadably engage the threaded rod;

at least one washer adapted to be disposed between the nut and the electrical terminal connector;

the nut being adapted to force the at least one washer and the electrical terminal connector against the flange of the threaded rod; and a conductive coating disposed against a surface of the electrical terminal connector, wherein the conductive coating allows the electrical terminal connector to rotate with respect to the element when the nut forces the at least one washer and the electrical terminal connector against the flange of the threaded rod.

18. System for fixing an electric terminal connector on an element, comprising:

a threaded rod adapted to be secured to the element;

a nut, provided with a clamping washer adapted to clamp the terminal connector on one of, said element, or an electrically conductive ring having a flange thereon, said ring being attached to said element;

said clamping washer having a surface thereon adapted to be positioned across a surface on the terminal connector, wherein the surfaces across from the terminal connector and the clamping washer are rotatable relative to each other without unscrewing said nut, relative rotatability of the surfaces being facilitated by at least an antifriction treatment;

an antifriction washer inserted between the terminal connector and the clamping washer, the antifriction washer having at least one of its surfaces antifriction treated so as to, at least one of, rotate by sliding on the clamping washer and have the terminal connector turn by sliding on an antifriction treated surface, the antifriction washer being integral with the clamping washer, the antifriction treated surface of the antifriction washer being that opposite to said clamping washer.

\* \* \* \* \*